United States Patent
Williams (10) Patent No.: US 11,255,262 B2
(45) Date of Patent: Feb. 22, 2022

(54) HYBRID COMPRESSED AIR ENERGY STORAGE SYSTEM

(71) Applicant: Dresser-Rand Company, Olean, NY (US)

(72) Inventor: Joseph T. Williams, Kirkland, WA (US)

(73) Assignee: DRESSER-RAND COMPANY, Olean, NY (US)

( * ) Notice: Subject to any disclaimer, the term of this patent is extended or adjusted under 35 U.S.C. 154(b) by 0 days.

(21) Appl. No.: 16/856,627

(22) Filed: Apr. 23, 2020

(65) Prior Publication Data

US 2021/0332752 A1 Oct. 28, 2021

(51) Int. Cl.

| | |
|---|---|
| *F02C 6/18* | (2006.01) |
| *F02C 6/16* | (2006.01) |
| *F02C 1/05* | (2006.01) |
| *F02C 7/141* | (2006.01) |
| *H02J 15/00* | (2006.01) |
| *F02C 6/14* | (2006.01) |
| *F03D 9/17* | (2016.01) |

(52) U.S. Cl.
CPC ............... *F02C 6/18* (2013.01); *F02C 1/05* (2013.01); *F02C 6/14* (2013.01); *F02C 6/16* (2013.01); *F02C 7/141* (2013.01); *F03D 9/17* (2016.05); *H02J 15/006* (2013.01); *F05D 2220/60* (2013.01); *F05D 2220/76* (2013.01); *F05D 2260/213* (2013.01)

(58) Field of Classification Search
CPC ..... F02G 6/16; F02G 6/14; F02C 1/05; F05D 2220/60; F05D 2220/76; F05D 2220/213; F17C 1/007; H02J 15/006; Y02E 60/14; Y02E 60/15; F03D 9/17; F03D 9/18; F28D 2021/0047
USPC .................................................... 60/659, 712
See application file for complete search history.

(56) References Cited

U.S. PATENT DOCUMENTS

| | | |
|---|---|---|
| 4,523,432 A | 6/1985 | Frutschi |
| 4,765,142 A | 8/1988 | Nakhamkin |
| 2009/0178384 A1 | 7/2009 | Nakhamkin |

(Continued)

FOREIGN PATENT DOCUMENTS

| | | |
|---|---|---|
| CN | 202073603 U | 12/2011 |
| CN | 102953823 A | 3/2013 |

(Continued)

*Primary Examiner* — Mark A Laurenzi
*Assistant Examiner* — Mickey H France (57) ABSTRACT

A hybrid compressed air energy storage system is provided. A heat exchanger 114 extracts thermal energy from a compressed air to generate a cooled compressed air stored in an air storage reservoir 120, e.g., a cavern. A heat exchanger 124 transfers thermal energy generated by a carbon-neutral thermal energy source 130 to cooled compressed air conveyed from reservoir 120 to generate a heated compressed air. An expander 140 is solely responsive to the heated compressed air by heat exchanger 124 to produce power and generate an expanded air. Expander 140 is effective to reduce a temperature of the expanded air by expander 140, and thus a transfer of thermal energy from an expanded exhaust gas received by a recuperator 146 (used to heat the expanded air by the first expander) is effective for reducing waste of thermal energy in exhaust gas cooled by recuperator 146.

22 Claims, 3 Drawing Sheets

(56) References Cited

U.S. PATENT DOCUMENTS

| | | | |
|---|---|---|---|
| 2010/0251712 A1 | 10/2010 | Nakhamkin | |
| 2011/0094229 A1 | 4/2011 | Freund et al. | |
| 2011/0094236 A1 | 4/2011 | Finkensall et al. | |
| 2013/0001948 A1* | 1/2013 | Lim | F02C 7/08 |
| | | | 290/52 |
| 2013/0125525 A1 | 5/2013 | Hein et al. | |
| 2014/0137563 A1 | 5/2014 | Kerth et al. | |
| 2016/0352282 A1* | 12/2016 | Lasich | F01D 15/10 |
| 2017/0241338 A1 | 8/2017 | Forrest et al. | |
| 2017/0350318 A1* | 12/2017 | Williams | F02C 7/14 |

FOREIGN PATENT DOCUMENTS

| | | |
|---|---|---|
| CN | 103225598 A | 7/2013 |
| CN | 204457884 U | 7/2015 |
| WO | 2011059557 A2 | 5/2011 |
| WO | 2015015184 A2 | 2/2015 |

\* cited by examiner

HYBRID COMPRESSED AIR ENERGY STORAGE SYSTEM

BACKGROUND

Disclosed embodiments are directed to a Compressed Air Energy Storage (CAES) system, and, more particularly, to a hybrid CAES system incorporating aspects of a diabatic CAES system and an adiabatic CAES system integrated with a carbon-neutral thermal energy source.

Compressed air energy storage (CAES) systems store excess power available in an electrical grid during off-peak load periods and in turn supply electricity to the electrical grid during peak load periods. The CAES systems produce stored energy by compressing and storing a gas during the off-peak load periods and generate electricity by expanding the stored compressed gas during the peak load periods.

DETAILED DESCRIPTION

The present inventor has recognized that energy consumption and concomitant emissions of waste products have become an increasing concern in the power generation industry. A typical power plant using fossil fuels can produce tons of waste products, such as carbon dioxide ($CO_2$); a gas which strongly absorbs the infrared radiation in sunlight, and is believed to be substantially responsible for global warming of the Earth's atmosphere—also referred to as the "greenhouse effect".

Disclosed embodiments propose an efficient hybrid CAES system blending a diabatic CAES system and an adiabatic CAES system integrated with a carbon-neutral thermal energy source to improve the overall efficiency of the hybrid CAES system (i.e., a system with a reduced-carbon footprint), thus conducive to attaining economic feasibility and sustainability.

In the following detailed description, various specific details are set forth in order to provide a thorough understanding of such embodiments. However, those skilled in the art will understand that disclosed embodiments may be practiced without these specific details that the aspects of the present invention are not limited to the disclosed embodiments, and that aspects of the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

Figure 1:
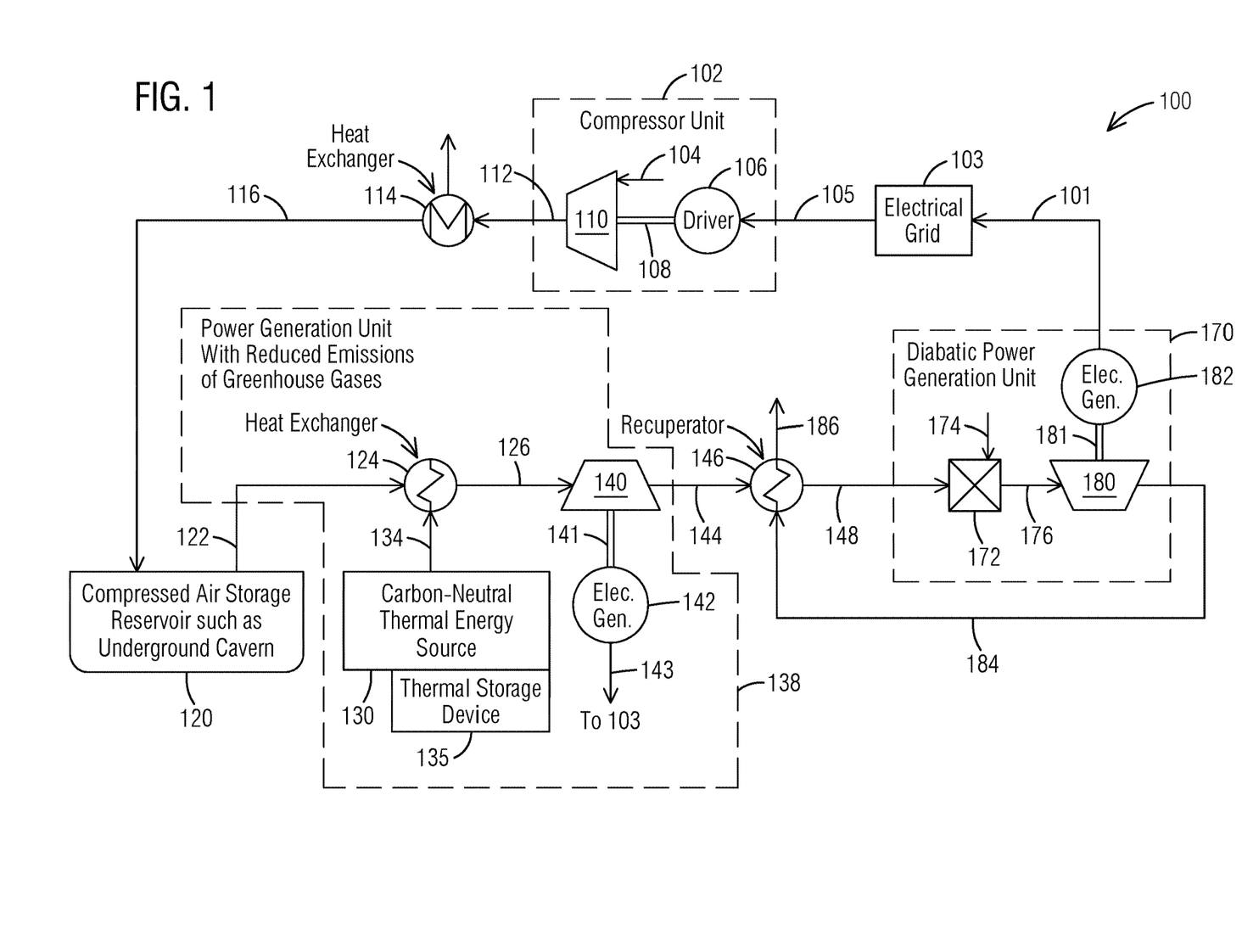
FIG. 1 shows a schematic diagram of one non-limiting embodiment of a disclosed hybrid CAES system.

FIG. 1 shows a schematic diagram of one non-limiting embodiment of a disclosed hybrid CAES system 100. The hybrid CAES system 100 may be a hybrid adiabatic-diabatic CAES system comprising synergistic aspects of a diabatic CAES system and an adiabatic CAES system integrated with a carbon-neutral thermal energy source. The hybrid CAES system 100 may include one or more adiabatic power generation units 138 integrated with one or more carbon-neutral thermal energy sources.

For purposes of this disclosure, thermal energy sources that are "carbon-neutral" during operation will be referred to as "carbon-neutral" thermal energy sources. Non-limiting examples of carbon-neutral thermal energy sources may include solar thermal, geothermal, thermal energy sources based on waste-heat, thermal energy sources based on composting, etc. It will be appreciated that some carbon-neutral thermal energy sources, such as solar-based, may be intermittent.

In one non-limiting embodiment, the hybrid CAES system 100 may include one or more compressor units 102. Each compressor unit 102 may include one or more drivers 106 and one or more compressors 110. The driver 106 may power or drive the compressor 110 and may be coupled to the compressor 110 by one or more driveshafts 108. The compressor unit 102 may receive and compress a process gas, such as air, via line 104 and may discharge a compressed process gas, such as compressed air, via line 112 during off-peak load periods.

In one or more examples, the compressor 110 may receive and compress ambient air via line 104 and may discharge compressed air via line 112. The driver 106 may be or include, but is not limited to, one or more electric motors, one or more turbines or expanders, or a combination thereof. The compressor 110 may be or include, but is not limited to, one or more of a supersonic compressor, a centrifugal compressor, an axial flow compressor, a reciprocating compressor, a rotary screw compressor, a rotary vane compressor, a scroll compressor, or a diaphragm compressor.

Although one compressor unit 102 containing one driver 106 and one compressor 110 are depicted in FIG. 1, any number of compressor units 102 containing one or more drivers 106 and one or more compressors 110 may be used in a compressor train, not shown, in the hybrid CAES system 100. For example, the hybrid CAES system 100 may include, but is not limited to 2, 3, 4, 5, 6, 7, 8, or more compressor units 102 containing one or more drivers 106 and one or more compressors 110.

In one or more embodiments, not shown, the hybrid CAES system 100 may include a first driver that may drive a first compressor, a second driver that may drive a second compressor, a third driver that may drive a third compressor, and a fourth driver that may drive a fourth compressor. In some examples, each pair of the driver 106 and the compressor 110 may be disposed together in a hermetically sealed casing (not shown).

Without limitation, one or more compressors 110 may be one or more DATUM centrifugal compressor units. In another example, one or more compressors 110 may be one or more DATUM-S compressor units. In another example, one or more compressors 110 may be one or more STC-GV compressor units, each of the foregoing example compressor units being commercially available from Dresser-Rand, a Siemens business.

One or more heat exchangers 114 may receive the compressed air via line 112 discharged by compressor 110. The heat exchanger 114 may extract thermal energy from the compressed air (e.g., discharged to the surrounding environment outside hybrid CAES system 100) and may discharge a cooled compressed air via line 116.

One or more air storage reservoirs 120 may receive the cooled compressed air via line 116 from the heat exchanger 114. The cooled compressed air may be stored or otherwise maintained with the air storage reservoir 120 as a stored compressed air. In some examples, the cooled compressed air via line 116 may be continuously flowed or otherwise transferred into the air storage reservoir 120 and maintained as the stored compressed air. In other examples, the cooled compressed air via line 116 may be intermittently flowed or otherwise transferred at different times into the air storage reservoir 120. Therefore, the stored compressed air maintained within the air storage reservoir 120 may be or include air from one batch or multiple batches.

During off-peak load periods, (e.g., during a charging mode of the hybrid compressed air energy storage system) one or more compressor units 102 (e.g., the compressor train) may compress air and/or one or more other process gases, and the compressed air or process gas may be introduced to and stored in the air storage reservoir 120. In some nonlimiting examples, the air storage reservoir 120 may be one or more caverns (e.g., underground caverns) or one or more vessels. The air storage reservoir 120 may be or include, but is not limited to, one or more of: a rock cavern, a salt cavern, an aquifer, an abandoned mine, a depleted gas or oil field, a well, a container, tank, or vessel stored underwater or the ground, a container, tank, or vessel stored on, within or above the ground.

During peak load periods, (e.g., during the electric power generation mode) the stored compressed air from the air storage reservoir 120 may be drawn from the air storage reservoir 120 via line 122 to be heated by heat exchanger 124. Heat exchanger 124 is coupled, such as via line 134, to a carbon-neutral thermal energy source 130 to transfer thermal energy generated by thermal energy source 130 to cooled compressed air that, during the electric power generation mode is heated by heat exchanger 124 to produce the heated compressed air via line 126, used to power one or more expanders 140. The expander 140 may receive the heated compressed air discharged from heat exchanger 124. Expander 140 may be arranged to operate in a first pressure range.

In certain applications, such as may involve an intermittent thermal energy source 130, a thermal storage device 135 may be used to store thermal energy during periods of intermittent operation by the intermittent thermal energy source. For example, in case thermal energy source 130 is solar, then thermal storage device 135 would be used to, for example, store thermal energy for use at night or during cloudy days.

In the event that there is insufficient heat available from thermal energy source 130 (and/or thermal storage device 135) to meet demand, there are two non-limiting alternative techniques that could be optionally utilized to meet the demand. In one optional technique one may couple an auxiliary thermal generator, such may be obtained from a driver (e.g., electric motor) arranged to convert rotating energy to thermal energy; or may be obtained from (e.g., a duct burner) that would enable use of natural gas heating for the relatively short periods that heat from thermal energy source 130 may not be available. In this latter scenario, the hybrid CAES system 100 would behave as a diabatic system for such short periods, and the carbon emissions would approximate those of a traditional diabatic CAES system on a 1bm $CO_2$/MW-hr basis.

In another optional technique, one may include a bypass/throttling system that—during the relatively short periods that heat from thermal energy source 130 may not be available—would allow diverting stored compressed air from air storage reservoir 120 around the non-functioning power generation unit 138, to deliver air, at an appropriate pressure, to diabatic power generation unit 138. This alternative optional technique would reduce the amount of power generated by hybrid CAES system 100 during such short periods, and carbon emissions would approximate those of a traditional diabatic CAES system on a 1bm $CO_2$/MW-hr basis.

Without limitation, the first pressure range for operation of expander 140 is selected to accommodate pressure levels of the cooled compressed air stored in the air storage reservoir 120. Without limitation, depending on factors such as structural characteristics of air storage reservoir 120, depth of air storage reservoir 120, etc., in certain non-limiting applications the pressure level of the cooled compressed air stored in the air storage reservoir 120 could be as high as approximately 2500-2700 psi. In other non-limiting applications, the pressure level of the cooled compressed air stored in the air storage reservoir 120 may be relatively lower, such as in the order of approximately 750-1500 psi.

In the first illustrated application, an expander train may be formed by three expanders to transition from the pressure levels that may be as high as 2500-2700 psi to pressure levels approximate to or equal to standard atmospheric pressure. In this application, expander 140 would be a relatively higher-pressure expander compared to the other two expanders in the expander train. In the second application, the expander train may be formed by just two expanders to transition from pressure levels that may be in the order of approximately 750-1500 psi to pressure levels approximate to or equal to standard atmospheric pressure.

The expander 140 may expand the heated compressed air and may discharge an expanded air via line 144. In some examples, the thermal energy transferred from carbon-neutral thermal energy source 130 may be the only thermal energy used to heat or otherwise increase the temperature of the heated compressed air expanded by the expander 140.

The expander 140 may generate or otherwise produce power due to the expansion of the heated compressed air. In one or more examples, the expander 140 may produce electricity by powering one or more electrical generators 142 coupled thereto by one or more driveshafts 141. The electrical generator 142 may generate electricity and upload or otherwise transfer the generated electricity to an electrical grid 103 via line 143 during peak load periods. In one or more examples, at least a portion of the generated electricity may be transferred from the electrical grid 103 via line 105 to one or more drivers 106, as shown, or may be transferred directly from the electrical generator 142 to one or more drivers 106 or other electrical devices, not shown. In other examples, not shown, the expander 140 may be coupled to and power or otherwise drive one or more pumps, one or more compressors, and/or pieces of other process equipment.

One or more recuperators 146 may receive the expanded air via line 144, heat the expanded air, and discharge a heated expanded air via line 148. The recuperator 146 may also receive an expanded exhaust gas via line 184, cool the expanded exhaust gas, and discharge a cooled exhaust gas via line 186. For example, the cooled exhaust gas may be vented or otherwise released into the ambient atmosphere. The thermal energy in the expanded exhaust gas via line 184 may be transferred by the recuperator 146 to the expanded air via line 144 to produce the heated expanded air via line 148.

Although not shown, the recuperator 146 may include a cooling portion and a heating portion. The recuperator 146 may transfer thermal energy from the cooling portion to the heating portion. More specifically, the recuperator 146 may transfer thermal energy from heated fluids or gases contained in the cooling portion to other fluids or gases contained in the heating portion. The recuperator 146 may be configured to transfer thermal energy from the expanded exhaust gas to the heated expanded air. For example, the cooling portion of the recuperator 146 may receive the expanded exhaust gas via line 184 and discharge the cooled exhaust gas via line 186, and the heating portion of the recuperator 146 may receive the first expanded air via line 144 and may discharge the heated expanded air via line 148.

In one or more embodiments, the expander 140 may be fluidly coupled to and disposed between the heat exchanger 124 and the recuperator 146, such as, for example, downstream of the heat exchanger 124 and upstream of the recuperator 146. The expander 140 may be used to increase the amount of thermal energy (heat of compression) that is recovered as electricity by the electrical generator 142 and may be used to reduce the temperature of the expanded air discharged from expander 140.

A technical advantage of disclosed embodiments may be conceptualized as follows: the less thermal energy contained in the expanded air introduced into the recuperator 146 via line 144, the more thermal energy may be transferred from the expanded exhaust gas in line 184 to the heated expanded air in line 148 by the recuperator 146. By increasing the thermal energy transfer from the expanded exhaust gas via line 184 by the recuperator 146, less thermal energy would be lost or otherwise discharged with the cooled exhaust gas via line 186 outside of the hybrid CAES system 100.

The hybrid CAES system 100 may include one or more diabatic power generation units 170. The arrangement of expander 140 between heat exchanger 124 and recuperator 146 enables the adiabatic and diabatic portions of the system to be linked to one another while preserving the technical benefits of either portion, and avoiding concomitant detriments, effectively creating an efficient and environmentally friendly hybrid system.

Each of the power generation units 170 may include one or more combustors 172, one or more expanders 180, and one or more electrical generators 182. In this embodiment, expander 180 may be arranged to operate in a second pressure range, which is lower than the first pressure range of expander 140. As noted above, in this embodiment, the expander train may be formed by expanders 140 and 180 (i.e., just two expanders), which is effective to transition from pressure levels that may be in the order of approximately 750 psi-1500 psi (e.g., by expander 140) to a pressure level approximate to or equal to standard atmospheric pressure (e.g., by expander 180).

The heated expanded air via line 148 may be transferred to the combustor 172. One or more fuels, water, steam, one or more oxygen sources, additives, or any mixture thereof may be added or otherwise transferred to the combustor 172 via line 174 and combined with the heated expanded air in the combustor 172 to produce the fuel mixture. Alternatively, in another embodiment, the one or more fuels, water, steam, oxygen sources (e.g., $O_2$), and/or additives may be combined and mixed with the heated expanded air within the line 148 to produce the fuel mixture upstream of the combustor 172 (not shown). The fuel mixture containing the heated expanded air may be combusted within the combustor 172 to produce an exhaust gas. Illustrative fuels may be or include, but are not limited to, one or more hydrocarbon fuels (e.g., alkanes, alkenes, alkynes, or alcohols), hydrogen gas, syngas, or any combination thereof. Illustrative hydrocarbon fuels may be or include, but are not limited to, methane, ethane, acetylene, propane, butane, gasoline, kerosene, diesel, fuel oil, biodiesel, methanol, ethanol, or any mixture thereof.

Once the fuel mixture is combusted, the combustor 172 may discharge the exhaust gas via line 176 that is transferred to the expander 180. The expander 180 may receive and expand the exhaust gas via line 176 discharged by the combustor 172. The expander 180 may expand the exhaust gas to generate or otherwise produce power. In one or more examples, the expander 180 may produce electricity by powering or driving one or more electrical generators 182 coupled thereto by one or more driveshafts 181. The electrical generator 182 may generate electricity and upload or otherwise transfer the generated electricity to the electrical grid 103 via line 101 during peak load periods. In other examples, the expander 180 may be coupled to and power one or more pumps, one or more compressors, other rotary equipment, and/or other components that may be contained within the hybrid CAES system 100 or other systems (not shown).

The expander 180 may discharge an expanded exhaust gas via line 184. The expanded exhaust gas may have a temperature in a range from about 600° F. (316° C.) to about 1,200° F. (649° C.). The recuperator 146 may receive and cool the expanded exhaust gas via line 184 and may discharge the cooled exhaust gas via line 186. For example, the cooled exhaust gas may be discharged into the ambient atmosphere or transferred to other components contained within the hybrid CAES system 100 or other systems (not shown). In one non-limiting embodiment, the cooled exhaust gas may have a temperature in a range from approximately 212° F. (100° C.) to approximately 550° F. (288° C.). In another non-limiting embodiment, the cooled exhaust gas may have a temperature in a range from approximately 300° F. (149° C.) to approximately 500° F. (260° C.).

Figure 2:
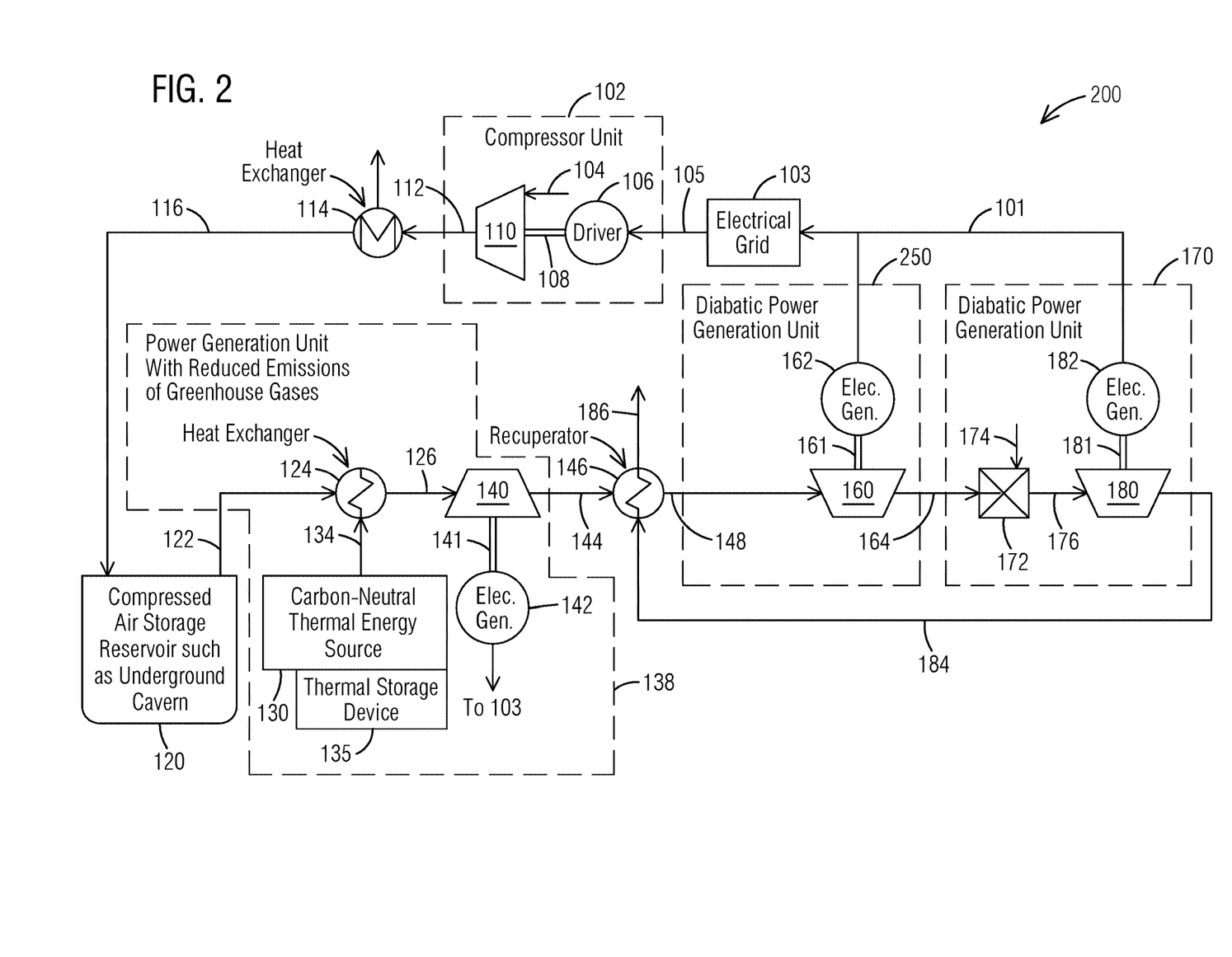
FIG. 2 shows a schematic diagram of another non-limiting embodiment of a disclosed hybrid CAES system.

FIG. 2 depicts a schematic diagram of an illustrative hybrid CAES system 200 that may include one or more diabatic power generation units 250 fluidly coupled to and disposed between the recuperator 146 and the diabatic power generation unit 170, such as, for example, downstream of the recuperator 146 and upstream of diabatic power generation unit 170.

Figure 3:
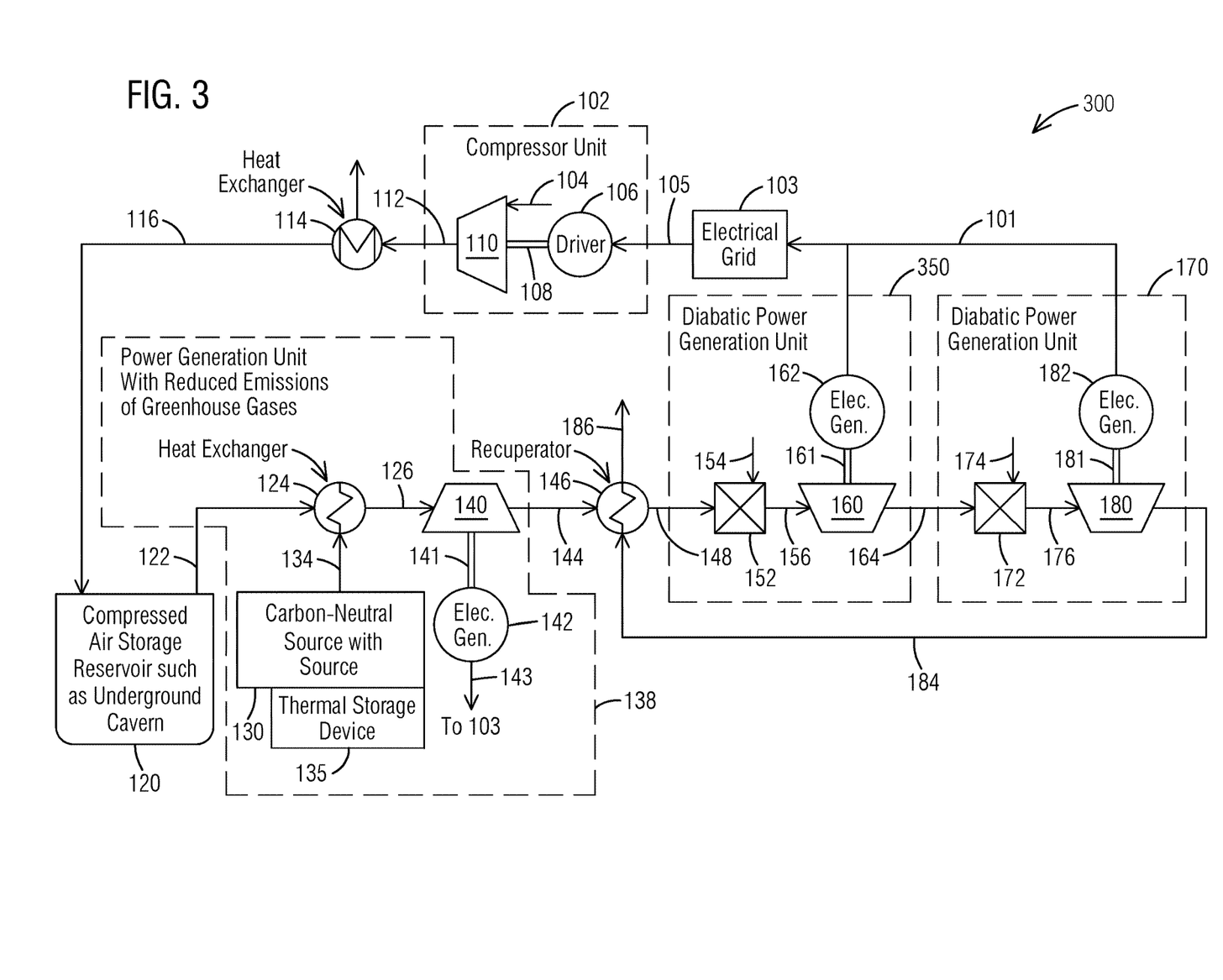
FIG. 3 shows a schematic diagram of yet another non-limiting embodiment of a disclosed hybrid CAES system.

FIG. 3 depicts a schematic diagram of an illustrative hybrid CAES system 300 that may include one or more power generation units 350 disposed downstream of the recuperator 146 and upstream of the power generation unit 170. Each hybrid CAES system 200, 300 may be a hybrid adiabatic-diabatic CAES system that may have aspects of an adiabatic CAES system and a diabatic CAES system. The hybrid CAES systems 200, 300 or portions thereof depicted in FIGS. 2 and 3, respectively, and the hybrid CAES system 100 or portions thereof depicted FIG. 1 share many common components. It should be noted that like numerals shown in the FIGS. and discussed herein represent like components throughout the multiple embodiments disclosed herein.

Each of the diabatic power generation units 250, 350 may include one or more expanders 160 and one or more electrical generators 162, as depicted in FIGS. 2 and 3. The expander 160 may be or include one or more high pressure (HP) expanders. As noted above, in this embodiment, the expander train may be formed by expanders 140, 160 and 180 (i.e., three expanders), which is effective to transition from pressure levels that may be as high as 2500-2700 psi (by expander 140) to an intermediate pressure level (by expander 160) to a pressure level approximate to or equal to standard atmospheric pressure (by expander 180).

The diabatic power generation unit 350, depicted in FIG. 3, may also include one or more combustors 152 fluidly coupled to and disposed between the recuperator 146 and the expander 160, such as, for example, downstream of the recuperator 146 and upstream of the expander 160.

It will be appreciated that the combustors could be either directly-fired, as shown in the schematic, or indirectly-fired where external combustion produces heat which is then conducted into the working fluid (e.g., air). It is contemplated this feature to be an optional implementation in combustor 152 in FIG. 3, but it does not rule out that, based on the needs of a given application, this could be optionally implemented in other combustors.

In one or more embodiments, as depicted in FIG. 2, the expander 160 may receive via line 148 one or more heated expanded process gases, such as heated expanded air, discharged by the recuperator 146. The expander 160 may expand the heated expanded process gas or air to generate or otherwise produce power and may discharge one or more expanded process gases, such as expanded air, via line 164.

In one or more examples, the expander 160 may produce electricity by powering or driving one or more electrical generators 162 coupled thereto by one or more driveshafts 161. The electrical generator 162 may generate electricity and upload or otherwise transfer the generated electricity to the electrical grid 103 via line 101 during peak load periods. In other examples, the expander 160 may be coupled to and power one or more pumps, one or more compressors, other rotary equipment, and/or other components that may be contained within the hybrid CAES systems 200, 300 or other systems (not shown).

In other embodiments, as depicted in FIG. 3, the combustor 152 may receive one or more heated expanded process gases, such as heated expanded air, via line 148 discharged by the recuperator 146. The combustor 152 may discharge an exhaust gas that may be received by the expander 160 via line 156. The expander 160 may expand the exhaust gas or other expanded process gas to generate or otherwise produce power and may discharge one or more expanded exhaust gases via line 164.

The heated expanded air may be transferred to the combustor 152 via line 148. One or more fuels, water, steam, one or more oxygen sources, additives, or any mixture thereof may be added or otherwise transferred to the combustor 152 via line 154 and combined with the heated expanded air in the combustor 152 to produce the fuel mixture. Alternatively, in another embodiment, the one or more fuels, water, steam, oxygen sources (e.g., 02), and/or additives may be combined and mixed with the heated expanded air within the line 148 to produce the fuel mixture upstream of the combustor 152 (not shown). The fuel mixture containing the heated expanded air may be combusted within the combustor 152 to produce an exhaust gas. Illustrative fuels may be or include, but are not limited to, one or more hydrocarbon fuels (e.g., alkanes, alkenes, alkynes, or alcohols), hydrogen gas, syngas, or any combination thereof. Illustrative hydrocarbon fuels may be or include, but are not limited to, methane, ethane, acetylene, propane, butane, gasoline, kerosene, diesel, fuel oil, biodiesel, methanol, ethanol, or any mixture thereof.

Once the fuel mixture is combusted, the combustor 152 may discharge the exhaust gas that is transferred to the expander 160 via line 156. The expanded process gas may be transferred to the one or more combustors 172 via line 164 and combusted as discussed and described above. The expanded process gas may be or include, but is not limited to, air, exhaust gas, working fluid, or any mixture thereof. In one or more examples, the expanded process gas may be or include expanded air and may be discharged from the power generation unit 250 via line 164. In other examples, the expanded process gas may be or include expanded exhaust gas and may be discharged from the power generation unit 350 via line 164.

It will be appreciated that each of the embodiments depicted in FIGS. 1 through 3 may be optionally implemented in alternative ways. For example, in FIG. 1, expander 140 is illustrated as being coupled to drive electric generator 142 and expander 180 is illustrated as coupled to drive electric generator 182. One alternative implementation would be to couple expanders 140 and 180 to drive a common electric generator either via a single shaft arrangement, or a multi-shaft arrangement.

Similarly, in FIGS. 2 and 3, expander 140 is illustrated as being coupled to drive electric generator 142, expander 160 as being coupled to drive electric generator 162 and expander 180 is illustrated as being coupled to drive electric generator 182. One alternative implementation would be to couple expanders 140, 160 and 180 to drive a common electric generator either via a single shaft arrangement, or a multi-shaft arrangement.

It will be appreciated that in FIG. 1, driver 106, electric generator 142, and electric generator 182 may be made up of one or more individual machines. For example, driver 106, electric generator 142, and electric generator 182 may comprise a single electromotive machine integrating motoring and generating functionalities with clutches to appropriately engage or disengage associated machines. Similarly, in FIGS. 2 and 3, driver 106, electric generator 142, electric generator 162 and electric generator 182 may be made up of one or more individual machines.

One example of a double-ended motor/generator arrangement connected to two compressors at the motoring side and two expanders at the generating side may be as follows:

compressor-gear-compressor-gear-clutch-
-motor/generator-
-clutch-gear-expander-gear-expander While embodiments of the present disclosure have been disclosed in exemplary forms, it will be apparent to those skilled in the art that many modifications, additions, and deletions can be made therein without departing from the scope of disclosed embodiments and its equivalents, as set forth in the following claims.

What is claimed is:

1. A hybrid compressed air energy storage system, comprising:
    a compressor responsive to a driver to generate a compressed air during a charging mode of the hybrid compressed air energy storage system;
    a first heat exchanger configured to receive the compressed air by the compressor, extract thermal energy from the compressed air by the compressor, and generate a cooled compressed air, wherein the cooled compressed air by the first heat exchanger is conveyed to an air storage reservoir for storage;
    a carbon-neutral thermal energy source;
    a second heat exchanger coupled to the thermal energy source to transfer thermal energy supplied by the thermal energy source to cooled compressed air that, during an electric power generation mode of the hybrid compressed air energy storage system, is conveyed from the air storage reservoir to the second heat exchanger to generate a heated compressed air;

a first expander solely responsive to the heated compressed air by the second heat exchanger to produce power and generate an expanded air;

a recuperator arranged downstream of the first expander to receive the expanded air by the first expander and establish thermal transfer between received expanded air and an expanded exhaust gas received by the recuperator, the thermal transfer by the recuperator effective to transfer thermal energy from the received expanded exhaust gas to heat the expanded air by the first expander and in turn cool the received expanded exhaust gas to generate a cooled exhaust gas;

a first combustor arranged to receive the heated expanded air by the recuperator and generate an exhaust gas; and a second expander responsive to the exhaust gas by the first combustor to produce further power, the second expander being the source of the expanded exhaust gas received by the recuperator, wherein the first expander being solely responsive to the heated compressed air by the second heat exchanger is effective to reduce a temperature of the expanded air by the first expander, and thereby the transfer of thermal energy from the received expanded exhaust gas to heat the expanded air by the first expander is effective for reducing waste of thermal energy in the cooled exhaust gas by the recuperator.

2. The system of claim 1, wherein the first expander is arranged to operate in a first pressure range, wherein the first expander is coupled to drive a first electrical generator.

3. The system of claim 2, wherein the second expander is arranged to operate in a second pressure range, which is lower than the first pressure range, wherein the second expander is coupled to drive a second electrical generator.

4. The system of claim 1, wherein the first expander is arranged to operate in a first pressure range, and the second expander is arranged to operate in a second pressure range, which is lower than the first pressure range, wherein the first expander and the second expander are each coupled to drive a common electrical generator.

5. The system of claim 4, wherein the first pressure range accommodates pressure levels of the cooled compressed air stored in the air storage reservoir and the second pressure range accommodates ambient atmospheric pressure.

6. The system of claim 1, wherein the thermal transfer by the recuperator is effective so that the cooled exhaust gas by the recuperator comprises a temperature in a range from approximately 212° F. (100° C.) to approximately 550° F. (288° C.).

7. The system of claim 1, wherein the first combustor is arranged to combust a fuel mixture comprising the heated expanded air by the recuperator and a hydrocarbon fuel.

8. The system of claim 3, further comprising a third expander fluidly coupled between the recuperator and the first combustor, wherein the third expander is configured to receive and expand the heated expanded air by the recuperator.

9. The system of claim 8, wherein the third expander is arranged to operate in a third pressure range, which is between the first pressure range and the second pressure range, wherein the third expander is coupled to drive a third electrical generator.

10. The system of claim 1, wherein the first expander is arranged to operate in a first pressure range, and the second expander is arranged to operate in a second pressure range, which is lower than the first pressure range, and further comprising a third expander arranged to operate in a third pressure range, which is between the first pressure range and the second pressure range, wherein the first expander, the second expander and the third expander is each coupled to drive a common electrical generator.

11. The system of claim 8, further comprising a second combustor fluidly coupled between the recuperator and the third expander.

12. The system of claim 1, wherein the driver comprises an electric motor.

13. The system of claim 1, wherein the air storage reservoir comprises an underground cavern.

14. The system of claim 1, wherein the recuperator comprises a cooling portion and a heating portion and is arranged to transfer thermal energy between the cooling portion and the heating portion, wherein the cooling portion is arranged to receive the expanded exhaust gas by the second expander and generate the cooled exhaust gas, and wherein the heating portion is configured to receive the expanded air by the first expander and generate the heated expanded air.

15. The system of claim 1, wherein the carbon-neutral thermal energy source is selected from the group consisting of a solar thermal energy source, a geothermal energy source, a thermal energy source based on waste-heat, a thermal energy source based on composting.

16. The system of claim 1, wherein the carbon-neutral thermal energy source is an intermittent thermal energy source, and further comprising a thermal storage device to store thermal energy during periods of intermittent operation by the thermal energy source.

17. A hybrid compressed air energy storage system, comprising:
  a. a compressor responsive to a driver to generate a compressed air during a charging mode of the hybrid compressed air energy storage system;
  b. a first heat exchanger configured to receive the compressed air by the compressor, extract thermal energy from the compressed air by the compressor, and generate a cooled compressed air, wherein the cooled compressed air by the first heat exchanger is conveyed to an air storage reservoir for storage;
  c. a carbon-neutral thermal energy source;
  d. a second heat exchanger coupled to the thermal energy source to transfer thermal energy supplied by the thermal energy source to cooled compressed air that, during an electric power generation mode of the hybrid compressed air energy storage system, is conveyed from the air storage reservoir to the second heat exchanger to generate a heated compressed air;
  e. a first expander solely responsive to the heated compressed air by the second heat exchanger to produce power, and generate an expanded air;
  f. a recuperator arranged downstream of the first expander to receive the expanded air by the first expander and establish thermal transfer between the received expanded air and a second expanded exhaust gas received by the recuperator, the thermal transfer by the recuperator effective to transfer thermal energy from the received second expanded exhaust gas to heat the expanded air by the first expander and in turn cool the received second expanded exhaust gas to generated a cooled exhaust gas;

g. a first combustor arranged to receive the heated expanded air by the recuperator, combust a first fuel mixture including the heated expanded air by the recuperator and generate a first exhaust gas;

h. a second expander responsive to the first exhaust gas by the first combustor to produce further power and generate a first expanded exhaust gas;

i. a second combustor arranged to receive the first expanded exhaust gas by the second expander, combust a second fuel mixture including the first expanded exhaust gas by the second expander and generate a second exhaust gas; and j. a third expander responsive to the second exhaust gas by the second
combustor to produce still further power, the third expander being the source of the second expanded exhaust gas received by the recuperator, wherein the first expander being solely responsive to the heated compressed air by the second heat exchanger is effective to reduce a temperature of the expanded air by the first expander, and thereby the transfer of thermal energy from the received second expanded exhaust gas to heat the expanded air by the first expander is effective for reducing waste of thermal energy in the cooled exhaust gas by the recuperator.

18. The system of claim 17, wherein the first expander is arranged to operate in a first pressure range, the second expander is arranged to operate in a second pressure range and the third expander is arranged to operate in a third pressure range, wherein the first pressure range comprises higher pressure values relative to pressure values in the third pressure range, and wherein the second pressure range comprises pressure values between the respective pressure values of the first and third pressure ranges.

19. The system of claim 18, wherein the first pressure range accommodates pressure levels of the cooled compressed air stored in the air storage reservoir and the third pressure range accommodates ambient atmospheric pressure.

20. The system of claim 14, wherein the first expander, the second expander and a third expander are each respectively coupled to drive respective electrical generators, or wherein the first, second and third expanders are each respectively coupled to drive a common electrical generator.

21. The system of claim 17, wherein the carbon-neutral thermal energy source is selected from the group consisting of a solar thermal energy source, a geothermal energy source, a thermal energy source based on waste-heat, a thermal energy source based on composting.

22. The system of claim 17, wherein the carbon-neutral thermal energy source is an intermittent thermal energy source, and further comprising a thermal storage device to store thermal energy during periods of intermittent operation by the thermal energy source.

* * * * *